Sept. 18, 1962 W. G. COREY 3,054,421
AUTOMATIC FLUID-PRESSURE REGULATOR
Filed March 18, 1957 2 Sheets-Sheet 1
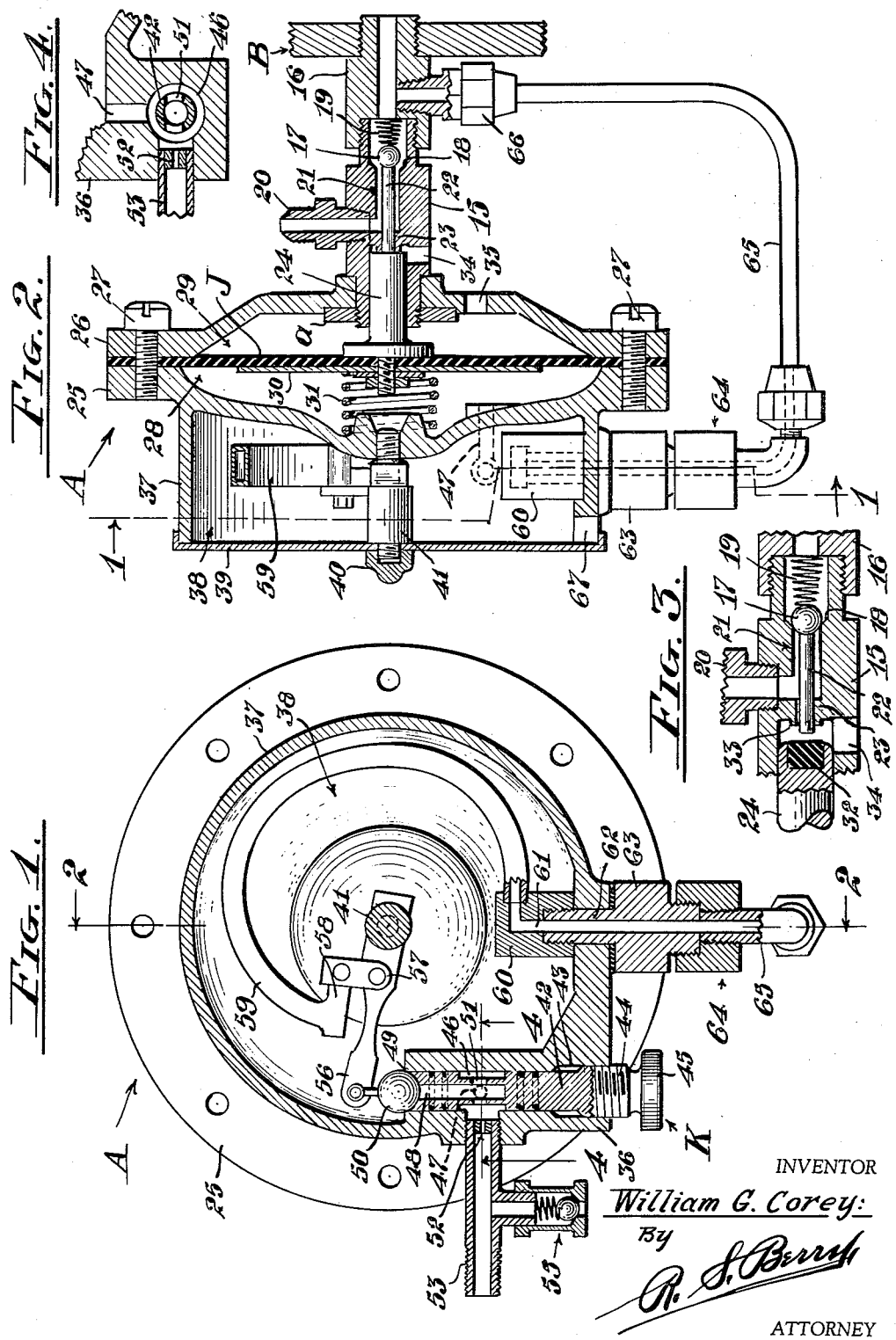
INVENTOR
William G. Corey:
By
R. S. Berry
ATTORNEY

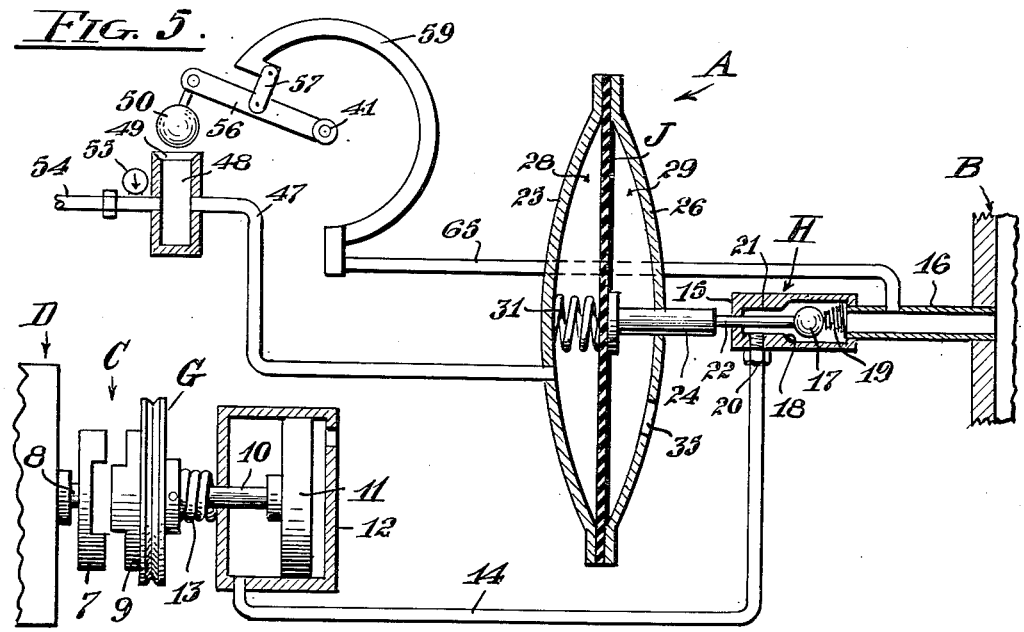
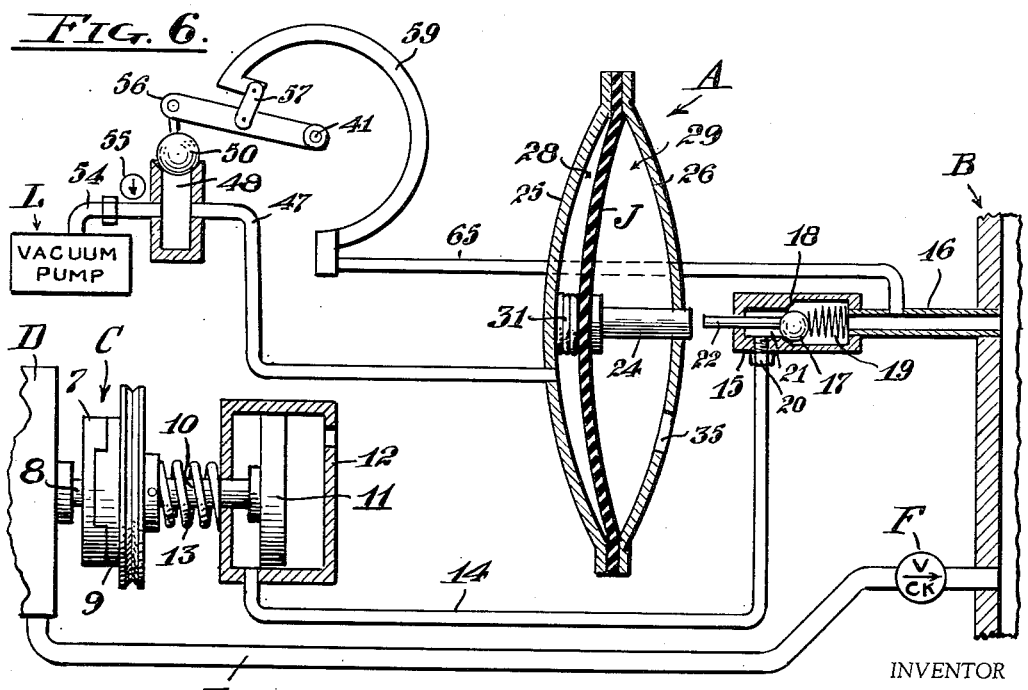

United States Patent Office 3,054,421
Patented Sept. 18, 1962

3,054,421
AUTOMATIC FLUID-PRESSURE REGULATOR
William G. Corey, Los Angeles, Calif.; Edward R. P. Montgomery, administrator of said William G. Corey, deceased
Filed Mar. 18, 1957, Ser. No. 646,801
9 Claims. (Cl. 137—489.5)

This invention relates to an automatic fluid-pressure regulator which, while being subject to other uses, is particularly designed to adjust and regulate the pressure of an air balanced oil well pumping unit wherein the regulator automatically controls the operation of an air-compressor in supplying air under pressure to a storage tank and maintaining the air at a pressure in the tank within a predetermined range.

An object of the invention is to provide a pressure regulator whereby a closer pressure control range is obtainable than may ordinarily be effected by fluid pressure regulators hertofore developed.

Another object is to provide a pressure regulator in which controlled negative pressure is utilized in effecting operation thereof and wherein the pressure control range of the regulator is determined by the negative pressure and is varied by regulation of such negative pressure.

Another object is to provide a highly efficient mechanism for varying the negative pressure which is extremely sensitive and is adapted to maintain the elected negative pressure constant thereby insuring against erratic operation of the regulator.

With the foregoing objects in view together with such other objects and advantages as may subsequently appear, the invention resides in the parts and in the combination, construction and arrangement of parts hereinafter described and claimed, and illustrated by way of example in the accompanying drawings in which:

FIG. 1 is a view of the regulator as seen in section and elevation on the line 1—1 of FIG. 2 in the direction indicated by the arrows;

FIG. 2 is a view in section and elevation taken on the line 2—2 of FIG. 1 showing the air clutch control valve thereof in its open position whereby a clutch controlled thereby is maintained open;

FIG. 3 is an enlarged detail in section of the air clutch control valve showing it in its closed position wherein an air clutch controlled thereby is closed to operate an air compressor;

FIG. 4 is a detail in cross section taken on the line 4—4 of FIG. 1;

FIG. 5 is a schematic diagram depicting the mode of operation of the regulator showing the parts as normally disposed wherein the regulator controlled clutch is maintained in an open position; and FIG. 6 is a view similar to FIG. 5 showing the parts as disposed to close the clutch to effect operation of a compressor.

Referring to the drawings more specifically A indicates generally the fluid pressure regulator embodying the invention which is here shown as applied to a storage tank B a wall portion only of which is here shown. As schematically depicted in FIGS. 5 and 6 the regulator A is associated with a fluid pressure controlled clutch C applied to an air compressor D for supplying air under pressure to the tank B through a conduit E (shown in FIG. 6) leading from the compressor to the tank through a check valve F in a usual manner.

The clutch C may be of any type adapted to be controlled by variations in air pressure applied to it, as for example the clutch generally indicated at 33 in Corey No. 2,493,341. As here shown the clutch C embodies a member 7 fixed on the drive shaft 8 of the compressor D and a moveable member 9 carried on a reciprocal shaft 10 fitted with a piston 11 in a cylinder 12, the shaft 10 being normally advanced under the urge of a spring 13 to engage the clutch members 7–9. The clutch member 9 has fixed thereon a pulley G driven from any suitable source of power from which the compressor D is actuated when the clutch C is engaged.

A conduit 14 leads from the cylinder 12 in front of the piston 11 to a control valve H interposed between the regulator A and the tank B which valve is controlled by the regulator A to deliver air under pressure from the tank B to the cylinder 12 to retract the piston 11 and disengage the clutch C and to retain it disengaged while the air pressure in the tank B is within a predetermined range.

The control valve H includes a tubular casing 15 one end of which is connected to a tubular coupling 16 connected to the tank B and opening thereinto, said coupling constituting the valve inlet. Mounted in the casing 15 is a valve 17 releasably closed at intervals against a seat 18 in the casing 15 under the urge of yieldable means comprising a spring 19 and the pressure of air from the tank B directed through the inlet coupling 16; the valve 17 controlling the flow of air from the tank B to the clutch C through the conduit 14 which latter leads from a nipple 20 on the casing 15 opening to a passage 21 in the latter leading to the discharge side of the valve seat 18. The passage 21 and nipple 20 constitute the valve outlet.

A slide pin 22 is loosely mounted in the casing 15 and extends axially along the passage 21 with one end thereof abutting the valve 17 and the other end extending through a septum 23 forming the outer end of the passage 21, the outer end of the slide pin having abutting engagement with a reciprocal piston 24 mounted in the bore of the casing 15 and forming part of the regulator A as will presently be described.

The regulator A embodies a housing comprising circular front and back walls 25 and 26 connected together along their margin on the opposite sides of the marginal portion of a diaphragm J by a series of screws 27, the margin of the diaphragm J being interposed and tightly clamped between the marginal portions of the walls 25 and 26.

The diaphragm J divides the interior of the regulator housing into front and rear chambers 28 and 29 flanked by the walls 25 and 26 respectively. The outer end of the valve casing 15 extends through the wall 26 centrally thereof and is clamped in engagement therewith by a nut $a$. The outer end of the piston 24 projects across the chamber 29 and is rigidly connected to the center of the diaphragm J. The central portion of the face of the diaphragm J presented to the chamber 28 is covered by a metallic disk 30 and interposed between such disk and the wall 25 is an expansion coil spring 31 tensioned to thrust the piston 24 to its innermost advanced position wherein it acts at times through the slide pin 22 to open the valve 17 in opposition to the spring 19 and air pressure from the tank B.

As a means for sealing the slight clearance space between the pin 22 and the encompassing wall of the septum 23 when the valve 17 is open and air under pressure occupies the passage 21, the inner end of the piston 23 is fitted with a cushion 32 which is adapted to abut the adjacent end of the pin 22 and also seat on a rim 33 on the septum 23 when the piston is in its fully advanced position as shown in FIG. 2. As a means for avoiding trapping of air in the space in front of the inner end of the piston 24 the casing 15 is formed with a vent 34 opening to the outer portion of the bore of the casing adjacent the rim 33.

Means are provided for retracting the piston 24 in opposition to the spring 31 to permit closing of the valve 17 and consequent closing of the clutch C and putting of the compressor D into operation when air pressure in the tank B falls below a certain point, which means operates through the medium of the diaphragm J by inducing negative pressure in the chamber 28 so that atmospheric pressure in the chamber 29 will move the diaphragm J in opposition to the spring 31, the wall 26 being formed with a vent 35 to permit intake and discharge of atmosphere to and from the chamber 29 on back and forth movement of the diaphragm J. Such means embodies an adjustable fitting K mounted in a housing 36 formed on the outer face of the wall 25 which latter is formed with an outwardly extending annular wall 37 merging into the housing 36 and encircling a space 38 which is closed by a removable cover 39 seated on the margin of the wall 37 and held in place by a nut 40 screwed on a post 41 carried on and extending axially from the wall 25. The fitting K embodies a cylindrical stem 42 mounted in a bore 43 extending vertically through the housing 36 and opening at its inner end to the space 38, the stem 42 being formed with a threaded outer end portion 44 screwed into the outer portion of the bore 43 whereby the stem 42 may be adjusted longitudinally in the latter. The outer end of the stem 42 is formed with a milled head 45 which is spaced from the adjacent end of the housing 36 for convenient grasping and manipulation in adjusting the stem 42 longitudinally in the bore 43. The stem 42 is reduced in diameter intermediate its ends to form a space 46 therearound, as particularly shown in FIG. 4, from which a passage 47 leads to the vacuum chamber 28.

The inner end portion of the stem 42 is formed with an axially extending passage 48 which opens to the space 38 through a valve seat 49 on the inner end of the stem, the passage 48 being normally closed at its inner end by a ball valve 50 as will be later described. The inner portion of the passage 48 opens to the space 46 in the housing 36 through an aperture 51 in the reduced portion of the stem 42.

Communicating with the space 46 through a restriction 52 at the inner end of the bore of a tubular coupling 53 having its outer end connected to a conduit 54 leading from a vacuum pump L which may be the intake manifold of an internal combustion engine, whereby negative pressure may be established within space 46, passage 47 and chamber 28 in front of the diaphragm J. The coupling 53 is fitted with a normally closed inwardly opening spring pressed valve 55 constituting a vacuum governor which is adapted to automatically open in event excessive negative pressure is developed in the bore of the coupling 53 and thereby admit air at atmospheric pressure into the coupling to partly neutralize the negative pressure induced therein.

The valve 50 is carried on a stem swiveled on the outer end of an arm 56 pivotally mounted on the inner end portion of the post 41 which arm is connected by a link 57 to a lateral extension 58 on one end of an arcuate tubular tensioned element 59 the outer end of which is fixed to a header 60 rigidly mounted on and projecting inwardly from the upper inner peripheral portion of the wall 37 and which element 59 acts together with suction induced in the passage 48 to normally retain the valve 50 tightly closed on the seat 49. The header 60 is formed with a passage 61 with which the tubular element 59 connects, and is screwed onto the end of a tubular nipple 62 extending through the wall 37 with the passage therein opening to the passage 61. The element 59 constitutes a Bourdon tube commonly employed in pressure regulators.

The nipple 62 is formed on a coupling 63 which seats on the outer face of the wall 37 and connects through a coupling assembly 64 with one end of a conduit 65 which leads to and connects through a coupling 66 with the interior of the coupling 16 whereby air under pressure developed in the tank B is directed to the element 59 which is responsive to such pressure and is adapted to spread out or expand in opposition to its tension, in the manner common in pressure gauges, to swing the arm 56 in a direction to move the valve 50 to an open position so as to admit air from the space 38 into the passage 48 and thereby neutralize negative pressure in the space 46 and the vacuum chamber 28 through the passage 47. The valve 50 is operative to destroy the vacuum in chamber 28 by reason of its orifice area 49–51 permitting a greater quantity of air to flow into said chamber than is permitted to be withdrawn by the vacuum source through the restriction 52. The space 38 is open to atmosphere through a vent 67 in the wall 37.

Adjustment of the regulator A to cause the compressor D to shut down or cut-in under certain variations of air pressure in the tank B is effected by shifting the stem 42 longitudinally in its housing 36 by turning the stem 42 to advance or retract it on its screw threads 44 which movement of the stem 42 varies the tension of the element 59, retraction of the stem 42 decreasing such tension while advance of the stem increases such tension. Varying the tension of the element 59 varies the stress thereof on the valve 50 and accordingly varies the required degree of intensity of air pressure delivered into the element 59 to lift the valve 50 from its seat, which action completely neutralizes the negative pressure induced in the vacuum chamber 28.

In the operation of the regulator A in controlling the compressor D to compensate for decrease of air pressure in the tank B, the regulator A is set by adjustment of the fitting K to set the compressor in operation on decrease of air pressure in the tank B to a predetermined pressure and to terminate operation of the compressor when a predetermined increased pressure has been developed in the tank B.

In action, a negative pressure is established in the vacuum chamber 28 by the induction of air therefrom as before described, and the valve 50 is maintained closed under the normal stress of the element 59 under low pressure therein. Air pressure in chamber 29 on the diaphragm J will then retract the piston 24 in opposition to spring 31 as shown in FIGS. 3 and 6 thereby allowing valve 17 to close and thereby cut off air supply to the clutch C so that the latter will close and set the compressor in operation to supply air pressure to tank B. On pressure being built up to a requisite extent in the tank B such pressure will be transmitted through conduit 65 to the element 59 thereby distending the curvature thereof in opposition to its tension such as to swing the arm 56 and unseat the valve 50 so as to break the negative pressure in the chamber 28 and permit the spring 31 to force the diaphragm J and piston 24 forwardly and cause the latter to open the valve 17 as shown in FIGS. 2 and 5 and thereby direct air under pressure through the conduit 14 to the clutch C to disengage it and shut down the compressor, thus completing a cycle of operation of the regulator A.

From the foregoing it will be seen that when air pressure in the tank B is within the predetermined range, such pressure will act to hold the clutch C disengaged and also to hold valve 50 open to thereby admit air at atmospheric pressure to the chamber 28 through passages 48 and 47 thereby equalizing air pressure on opposite sides of the diaphragm J so that spring 31 will then advance the diaphragm and piston 24 to effect opening of valve 17 and thereby effect disengagement of the clutch C, but when the tank pressure lowers to a point where the tube 59 contracts and closes valve 50, negative pressure, or partial vacuum, will be developed in the chamber 28 so that atmospheric pressure in chamber 29 will advance the diaphram J in opposition to the spring 31 and thereby retract the piston 24 so that valve 17 will close under the urge of the spring 19 and thus cause re-engagement of the clutch C.

To increase the pressure at which the compressor is set in operation the stem 42 is advanced on its threads 44 thus raising the unseating position of the valve 50 and requiring a higher pressure to cause the tube 59 to lift the valve 50 off its seat. Conversely to lower the pressure at which the compressor is set in operation the stem 42 is retracted to lower the unseating position of the valve 50 and requiring a lower pressure to cause the tube 59 to open the valve 50.

By the provision of the diaphragm J and the utilization of negative pressure on the spring pressed side thereof together with the employment of atmospheric pressure to actuate the diaphragm, and then controlling the negative pressure by rise and fall of mean pressure in the tank B a much closer pressure control range is attainable than has heretofore been possible in air balanced pump constructions employing standard commercial regulators.

While the regulator is here shown and described as utilized in actuating a pneumatic clutch in controlling the operation of an air compressor, it is manifestly suitable for other applications such as in actuating a pneumatically actuated valve for controlling the operation of a compressor.

While a specific embodiment of the invention has been shown and described, the invention is not limited to the exact details of construction set forth, and the invention embraces such changes, modifications and equivalents of the parts and their formation and arrangement as come within the purview of the appended claims.

I claim:

1. In a fluid pressure regulator embodying a housing, a control valve connected to said housing including a tubular casing having an inlet and an outlet with a valve seat therebetween and a valve arranged to close against said seat, yieldable means urging said valve to a closed position on said seat, a diaphragm carried by said housing dividing the interior thereof into a pair of chambers, a spring in one of said chambers urging said diaphragm in one direction, and means operated by said diaphragm under the urge of said spring for opening said valve; means connecting with said spring containing chamber for inducing negative pressure therein, said other chamber open to atmosphere whereby atmospheric pressure will act when said spring containing chamber is under negative pressure to move said diaphragm in opposition to said spring and thereby permit said valve to close; and fluid pressure responsive means on said housing operable under a predetermined pressure to open said spring containing chamber to atmosphere to neutralize the negative pressure therein including a valve controlling an air outlet orifice, said negative pressure means including a passage having a restriction; said orifice having an area permitting a greater quantity of air to flow into said spring containing chamber than is permitted to be withdrawn through said restriction.

2. The structure called for in claim 1 including means for adjusting said last named means to operate under various selected pressures.

3. In a fluid pressure regulator, a housing, a diaphragm in said housing, a vacuum chamber on one side of said diaphragm, a chamber open to atmosphere on the other side of said diaphragm, a spring in said vacuum chamber urging said diaphragm outwardly, a control valve attached to said housing including a tubular casing having an inlet and an outlet with a valve seat therebetween and a valve arranged to close against said seat, yieldable means urging said valve to a closed position on said seat, means actuated by said diaphragm to open said valve under the urge of said spring; means for inducing a negative pressure in said vacuum chamber whereby atmospheric pressure in said other chamber will retract said diaphragm in opposition to said spring and thereby allow said valve to close including a passage having a restriction therein; a passage leading to atmosphere from said vacuum chamber including an air outlet orifice, a valve normally closing said orifice, and fluid pressure responsive means on said housing operable under a predetermined pressure to open said last named valve and admit air to said vacuum chamber; said orifice having an area permitting a greater quantity of air to flow into said vacuum chamber than is permitted to be withdrawn through said restricted passage.

4. The structure called for in claim 3 together with manually operable means carried by said housing for regulating said last named means to operate under various selected pressures.

5. In a fluid pressure regulator, a housing, a diaphragm in said housing, a vacuum chamber on one side of said diaphragm, a chamber open to atmosphere on the other side of said diaphragm, a spring in said vacuum chamber urging said diaphragm outwardly, a control valve attached to said housing including a tubular casing having an inlet and an outlet with a valve seat therebetween and a valve arranged to close against said seat, yieldable means urging said valve to a closed position on said seat, means actuated by said diaphragm to open said valve under the urge of said spring; means for inducing a negative pressure in said vacuum chamber whereby atmospheric pressure in said other chamber will retract said diaphragm in opposition to said spring and thereby allow said valve to close; said means including a bore having a passage leading to said vacuum chamber, air conductive connections leading from a source of negative pressure to said bore including a restricted passage, a longitudinally adjustable tubular stem in said bore having a passage opening at one end only to atmosphere and also opening to said bore, a valve controlling the open end of said last named passage, and tensioned fluid pressure responsive means on said housing carrying said valve and normally holding it in its closed position and being operable under the urge of fluid pressure to open said valve; the valved open end of said last named passage having an area permitting a greater quantity of air to flow into said vacuum chamber than is permitted to be withdrawn through said restricted passage.

6. The structure called for in claim 5 together with a normally closed relief valve on said connections adapted to open and admit air thereto under excessive negative pressure therein.

7. A fluid pressure regulator comprising a housing embodying side walls united at their margins, a diaphragm in said housing having its margin clamped between the marginal portions of said side walls, said diaphragm dividing the interior of said housing into a pair of chambers one of which constitutes a vacuum chamber and the other of which is open to atmosphere; a tubular valve housing connected to one of said side walls having a passage therein opening at the outer end of said housing, a valve in said passage including a tubular casing having an inlet and an outlet with a valve seat therebetween and a valve arranged to close against said seat, yieldable means urging said valve to a closed position on said seat, a coupling connected to the outer end of said valve housing; a spring in said vacuum chamber exerting an outward thrust on said diaphragm; means actuated by said spring through said diaphragm for opening said valve; a passage in one of said side walls leading from said vacuum chamber; restricted means for connecting said passage to a source of negative pressure, means included in said last named means for admitting air to said vacuum chamber embodying an open ended sleeve the interior of which communicates with said passage; a ball valve adapted to seat on the open end of said sleeve; an arm carrying said ball valve pivoted on said housing, a tensioned fluid pressure responsive tube fixed at one end relative to said housing having an outer end connected to said arm, said tube normally seating said ball valve on said sleeve; air conducting connections between the fixed end of said tube and said coupling; and air conducting connections leading from the passage in said first named valve; the valved open end of said sleeve having an area permitting a greater quantity of air to flow into said vacuum chamber than is permitted to be withdrawn through said restricted means.

8. The structure called for in claim 7 in which said tubular sleeve has screw engagement with said housing for longitudinal adjustment thereon.

9. The structure called for in claim 7 together with a normally closed relief valve in the connection with the source of negative pressure adapted to admit air thereto under excessive negative pressure therein.

References Cited in the file of this patent

UNITED STATES PATENTS

| | | |
|---|---|---|
| 1,221,295 | Dopkins | Apr. 3, 1917 |
| 1,354,311 | Landrum | Sept. 28, 1920 |
| 1,732,717 | Faudi | Oct. 22, 1929 |
| 2,020,847 | Mitereff | Nov. 12, 1935 |
| 2,185,671 | Kimball | Jan. 2, 1940 |
| 2,188,761 | Peterson | Jan. 20, 1940 |
| 2,317,135 | Crittenden et al. | Apr. 20, 1943 |
| 2,424,836 | Mallory | July 29, 1947 |
| 2,634,747 | Markson | Apr. 14, 1953 |
| 2,731,980 | Diefenderfer | Jan. 24, 1956 |